(12) United States Patent
Wang et al.

(10) Patent No.: US 9,600,909 B2
(45) Date of Patent: Mar. 21, 2017

(54) PROCESSED TEXEL CACHE

(71) Applicant: Apple Inc., Cupertino, CA (US)

(72) Inventors: James Wang, Vista, CA (US); Abdulkadir U. Diril, Mountian View, CA (US)

(73) Assignee: Apple Inc., Cupertino, CA (US)

( * ) Notice: Subject to any disclaimer, the term of this patent is extended or adjusted under 35 U.S.C. 154(b) by 48 days.

(21) Appl. No.: 14/803,926

(22) Filed: Jul. 20, 2015

(65) Prior Publication Data

US 2017/0024905 A1    Jan. 26, 2017

(51) Int. Cl.

| | |
|---|---|
| G09G 5/02 | (2006.01) |
| G09G 5/06 | (2006.01) |
| G09G 5/39 | (2006.01) |
| G06T 11/00 | (2006.01) |
| G06T 1/20 | (2006.01) |
| G06T 15/04 | (2011.01) |
| G06T 19/00 | (2011.01) |
| G06T 11/40 | (2006.01) |
| G06F 15/76 | (2006.01) |
| G06F 17/30 | (2006.01) |
| H04N 1/60 | (2006.01) |
| H04N 5/357 | (2011.01) |
| H04N 19/40 | (2014.01) |
| G09G 5/37 | (2006.01) |

(52) U.S. Cl.
CPC ............. *G06T 11/001* (2013.01); *G09G 5/37* (2013.01)

(58) Field of Classification Search
CPC combination set(s) only.
See application file for complete search history.

(56) References Cited

U.S. PATENT DOCUMENTS

| | | | |
|---|---|---|---|
| 6,005,582 A * | 12/1999 | Gabriel | G06T 11/40 |
| | | | 345/586 |
| 6,184,888 B1 * | 2/2001 | Yuasa | A61J 7/0481 |
| | | | 345/419 |
| 7,777,749 B2 | 8/2010 | Chung et al. | |
| 8,891,886 B2 | 11/2014 | Nystad | |
| 2009/0278845 A1 | 11/2009 | Kato et al. | |
| 2013/0088504 A1 | 4/2013 | Strom et al. | |

(Continued)

*Primary Examiner* — Wesner Sajous
(74) *Attorney, Agent, or Firm* — Meyertons, Hood, Kivlin, Kowert & Goetzel, P.C.; Michael B. Davis (57) ABSTRACT

Techniques are disclosed relating to storing processed texture information. In some embodiments, a graphics unit is configured to store graphics textures in multiple different formats. In some embodiments, texture filtering circuitry in the graphics unit is configured to operate on texture information in a particular format, but not configured to operate on texture information in one or more of the plurality of different formats. In some embodiments, graphics circuitry is configured to receive texture information in the multiple different formats and process the information to generate processed texture information in the particular format that the texture filtering circuitry is configured to operate on. In some embodiments, the graphics unit includes a storage element with entries configured to store the processed texture information, and the texture filtering circuitry is configured to access processed texture information in an entry of the storage element as input for multiple different sampling operations.

20 Claims, 6 Drawing Sheets

(56) References Cited

U.S. PATENT DOCUMENTS

| | | | |
|---|---|---|---|
| 2013/0151608 A1* | 6/2013 | Wiseman | H04W 4/02 709/204 |
| 2013/0231180 A1* | 9/2013 | Kelly | G07F 17/3206 463/29 |
| 2014/0028693 A1* | 1/2014 | Wang | G06F 12/0875 345/557 |
| 2015/0089151 A1* | 3/2015 | Bolz | G06F 12/0815 711/141 |
| 2015/0091931 A1 | 4/2015 | Pelton et al. | |
| 2016/0071232 A1* | 3/2016 | Goodman | G06T 15/04 345/582 |
| 2016/0081378 A1* | 3/2016 | Madsen | A23P 30/40 426/564 |

* cited by examiner

PROCESSED TEXEL CACHE

BACKGROUND

Technical Field

This disclosure relates generally to graphics processing and more specifically to caching processed texture information.

Description of the Related Art

Graphics processing often involves executing the same instruction in parallel for different graphics elements (e.g., pixels or vertices). Graphics processors are often included in mobile devices such as cellular phones, wearable devices, etc., where power consumption and processor area are important design concerns.

Graphics textures are typically stored images that are "wrapped around" the surfaces of objects in a scene being rendered. The determination of which parts of the texture correspond to different parts of an object is typically referred to as texture mapping. Textures may be stored using a variety of different formats, which may use various different color spaces and compression schemes, for example. Textures are typically represented by arrays of "texels" just as images are represented using arrays of pixels. Processing stored texels to generate a format that a graphics unit (e.g., filtering circuitry) is configured to handle may consume significant power.

SUMMARY

Techniques are disclosed relating to caching processed texture information.

In some embodiments, a graphics unit is configured to store graphics textures in multiple different formats. In some embodiments, texture filtering circuitry in the graphics unit is configured to operate on texture information that is in a particular format, but not configured to operate on texture information that is in one or more of the plurality of different formats. Thus, in some embodiments, the graphics unit includes circuitry configured to receive texture information in ones of the multiple different formats and process the information to generate processed texture information in the particular format that the texture filtering circuitry is configured to operate on. In some embodiments, the graphics unit includes a storage element (exemplary embodiments of which are referred to herein as a "processed texel cache") that includes entries configured to store the processed texture information in the particular format, and the texture filtering circuitry is configured to access processed texture information in an entry of the storage element as input for multiple different texture sampling operations. This arrangement may reduce power consumption relative to the circuitry processing the stored texture information multiple times for the different sampling operations, in some embodiments. In these embodiments, the processing is performed once and the processed data is cached and potentially used multiple times. In some embodiments, the graphics unit is configured to access the storage element using texture coordinates associated with the particular format. This may reduce power consumption used to convert texture coordinates to memory addresses, in some embodiments.

In some embodiments, the storage element is tagged using a portion of an x coordinate of an access to the texture, a portion of a y coordinate of an access to the texture, a portion of a z coordinate of an access to the texture, at least a portion of a level of detail, and/or a texture identifier. In some embodiments, the graphics unit is configured to maintain a window corresponding to a portion of a texture being processed and use the storage element only for accesses that fall within the window. This may reduce power consumption used to compare tags, e.g., by reducing the number of bits compared for each tag.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112(f) for that unit/circuit/component.

DETAILED DESCRIPTION

Figure 1A:
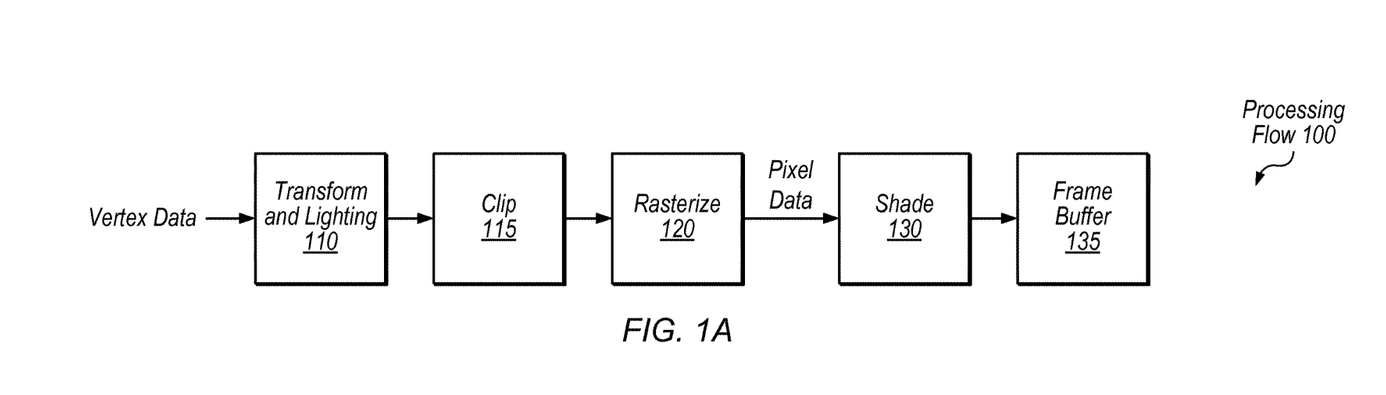
FIG. 1A is a block diagram illustrating an exemplary graphics processing flow.
Figure 1B:
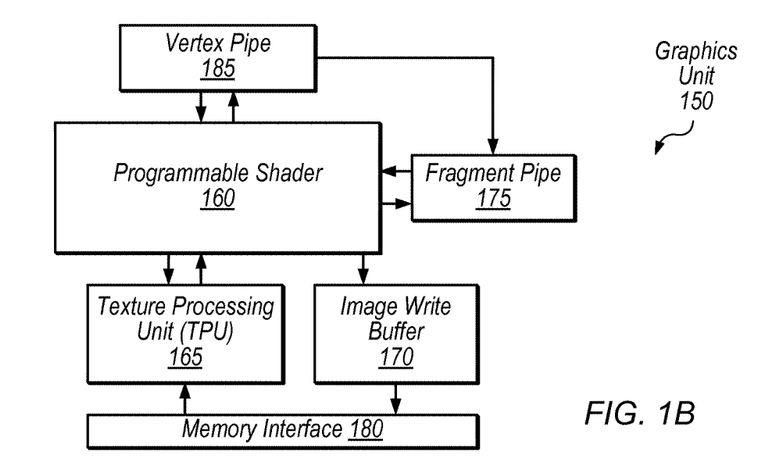
FIG. 1B is a block diagram illustrating one embodiment of a graphics unit.

This disclosure initially describes, with reference to FIGS. 1A-1B, an overview of a graphics processing flow and an exemplary graphics unit. Embodiments of a programmable shader that includes a processed texel cache are described with reference to FIGS. 2-5. An exemplary device is shown in FIG. 6. In some embodiments, the processed texel cache is configured to store processed texture information (e.g., texels) in a format that is usable by the graphics unit for further processing. Caching this processed information may reduce power consumption, in some embodiments.

Graphics Processing Overview

Referring to FIG. 1A, a flow diagram illustrating an exemplary processing flow 100 for processing graphics data is shown. In one embodiment, transform and lighting step 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip step 115 may involve discarding polygons or vertices that fall outside of a viewable area. Rasterize step 120 may involve defining fragments or pixels within each polygon and assigning initial color values for each fragment, e.g., based on texture coordinates of the vertices of the polygon. Shade step 130 may involve altering pixel components based on lighting, shadows, bump mapping, translucency, etc. Shaded pixels may be assembled in a frame buffer 135. Modern GPUs typically include programmable shaders that allow customization of shading and other processing steps by application developers. Thus, in various embodiments, the exemplary steps of FIG. 1A may be performed in various orders, performed in parallel, or omitted. Additional processing steps may also be implemented.

Referring now to FIG. 1B, a simplified block diagram illustrating one embodiment of a graphics unit 150 is shown. In the illustrated embodiment, graphics unit 150 includes programmable shader 160, vertex pipe 185, fragment pipe 175, texture processing unit (TPU) 165, image write buffer 170, memory interface 180, and texture state cache 190. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 and/or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 and/or programmable shader 160 to generate fragment data. Vertex pipe 185 and/or fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and/or TPU 165. Programmable shader 160 may be configured to perform vertex processing tasks on vertex data which may include various transformations and/or adjustments of vertex data. Programmable shader 160, in the illustrated embodiment, is also configured to perform fragment processing tasks on pixel data such as texturing and shading, for example. Programmable shader 160 may include multiple execution instances for processing data in parallel.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write buffer 170, in the illustrated embodiment, is configured to store processed tiles of an image and may perform final operations to a rendered image before it is transferred to a frame buffer (e.g., in a system memory via memory interface 180). Memory interface 180 may facilitate communications with one or more of various memory hierarchies in various embodiments.

In various embodiments, a programmable shader such as programmable shader 160 may be coupled in any of various appropriate configurations to other programmable and/or fixed-function elements in a graphics unit. The exemplary embodiment of FIG. 1B shows one possible configuration of a graphics unit 150 for illustrative purposes.

Exemplary Programmable Shader

Figure 2:
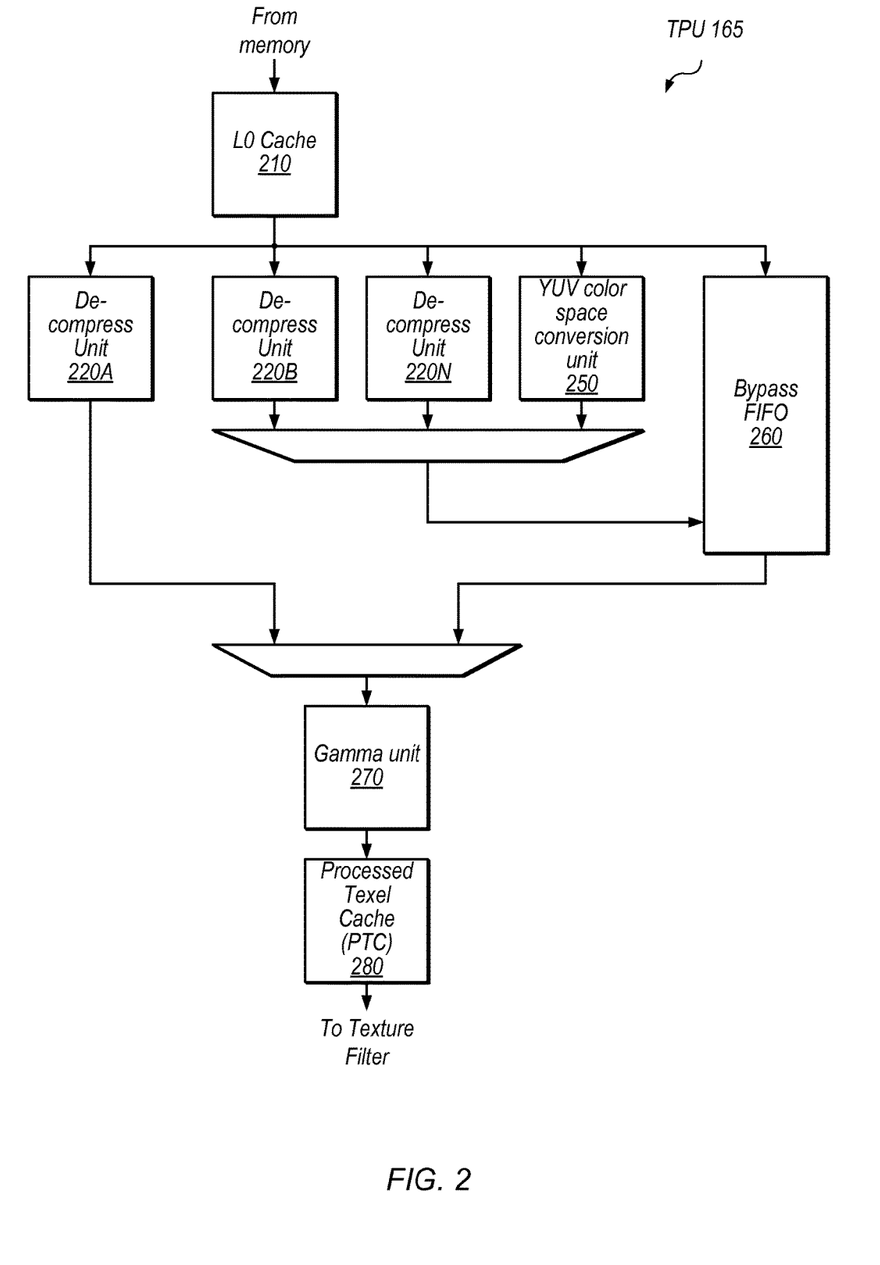
FIG. 2 is a block diagram illustrating a portion of a texture processing unit that includes a processed texel cache, according to some embodiments.

FIG. 2 shows a portion of TPU 165 that includes a processed texel cache, according to some embodiments. In some embodiments, the illustrated processing elements are configured to convert various texture formats into one or more formats that are supported by texture filtering circuitry (not shown). The filtering circuitry may be configured to perform various operations on texels in the supported format, such as interpolation between nearby texels, to eventually determine pixel attributes for pixels in a screen space.

As used herein, the term "texture" is used according to its ordinary meaning in the art, including data that indicates characteristics of the surface of an object to be generated by a graphics processor for display. These characteristics may include color, transparency, or any other appropriate value used in graphics processing. "Texture mapping" is a well-known graphics technique in which a texture is applied to the surface of a graphical element such as a shape or polygon. Textures may be "wrapped around" any of various 3-dimensional objects by mapping points in the objects to the texture.

Textures are typically represented by arrays of "texels" just as images are represented using arrays of pixels. Texels are typically the smallest unit in texture space, and indicate red, green, blue, and alpha attributes in some embodiments. The alpha attribute may indicate various information in different embodiments; it is often used to indicate translucency. Often, graphics processors initially determine texture coordinates for vertices of a polygon and then interpolate to determine texture coordinates of individual pixels representing the surface of the polygon. When a calculated texture coordinate does not directly map to a texel, texture filtering circuitry may apply filtering rules to determine pixel attributes based on one or more nearby texels.

In the illustrated embodiment TPU 165 includes L0 cache 210, multiple decompress units 220A-N, and a color space conversion unit (250) which are configured, along with bypass FIFO 260, to process texture data and provide it to gamma unit 270 and eventually to processed texel cache (PTC) 280. The multiplexers in the illustrated embodiment may be used to select the appropriate input from the various processing elements, based on the format of a texture being processed. In the illustrated embodiment, texture information from memory may be stored in L0 cache 210, which may be a lowest level in a cache/memory hierarchy in which texture data may be stored prior to processing.

Texture data stored in memory and/or L0 cache 210 may be stored in a variety of different formats. For example, some formats may allow compression of an original texture using various compression techniques. Non-limiting examples of various decompression schemes that may be implemented TPU 165 include: adaptive scalable texture compression (ASTC), Ericsson texture compression (ETC), and/or PowerVR texture compression (PVRTC).

As another example of texture formatting, different formats may use different color spaces. Some formats, such as YUV, Y'UV, YCbCr, YPbPr, etc. identify luma/chrominance characteristics. Other formats may be referred to as additive color models, including RGB and RGBA (which identify colors). In the illustrated embodiment, YUV color space conversion unit is configured to convert textures stored in a YUV space to an RGB space. In other embodiments any of various other appropriate color spaces may be used. The disclosed color spaces are exemplary only and are not intended to limit the possible color spaces used in various embodiments.

When a texture is sampled, TPU 165 typically receives coordinates from a graphics program and converts the coordinates to memory addresses, e.g., based on a base address in memory of a stored texture being accessed. In some embodiments, L0 cache 210 is tagged using portions of texture memory addresses while PTC 280 is tagged using portions of texture coordinates.

In the illustrated embodiment, decompress units 220A-N are configured to decompress textures that are stored using various exemplary compression schemes. In the illustrated embodiment, YUV color space conversion unit 250 is configured to convert texture information in a YUV color space to an RGB color space. In other embodiments, similar units may be configured to convert from any of various color spaces to a color space supported by texture filtering circuitry. In the illustrated embodiment, textures that are already in a desired compression state and color space are retrieved from L0 cache 210 and placed in bypass FIFO 260. Gamma unit 270, in the illustrated embodiment, is configured to decode textures that are gamma encoded.

PTC 280, in the illustrated embodiment, is configured to store texture information in one or more formats that the texture filtering circuitry is configured to handle. In some embodiments, this information is associated with x, y, and/or z coordinates of the stored texture, level of detail (LOD) information, and/or texture identifier information. In some embodiments, texel information stored in PTC 280 is uncompressed and is in an RGB color space. In some embodiments, TPU 165 is configured to use PTC 280 for only one texture at a time, while in other embodiments, TPU 165 may store valid data for multiple textures in PTC 280 at the same time. In some embodiments, caching processed texel information may reduce power consumption. For example, rather than processing the same portion of a texture multiple times for nearby sample operations, texels in the portion may be processed once and then the processed data may be retrieved from PTC 280 thereafter.

Figure 3:
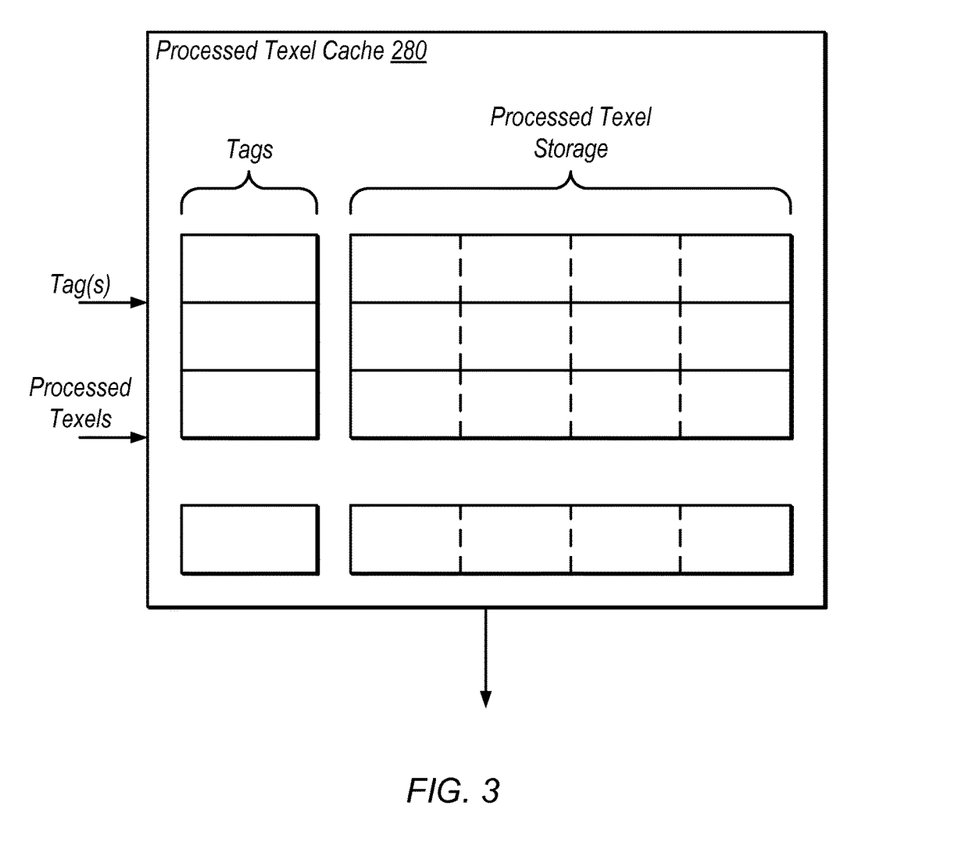
FIG. 3 is a block diagram illustrating a processed texel cache, according to some embodiments.

FIG. 3 illustrates a more detailed view of PTC 280, according to some embodiments. In the illustrated embodiment, PTC 280 includes a number of lines configured to store processed texels and a corresponding number of tags. The number of lines in PTC 280 may vary, in different embodiments. In some embodiments, the lines are tagged using portions of texture coordinates. Tagging is a well-known caching concept understood to those of skill in the art. In the illustrated embodiment, each line in PTC 280 is configured to store one, two, or four texels, e.g., depending on the texel size. In other embodiments, each line may be configured to store any of various appropriate numbers of texels. In some embodiments configured to store multiple texels per line, the texels in a given line are stored in a twiddled format, e.g., 1×1, 2×1, 2×2, 4×2, etc. In some embodiments, TPU 165 includes multiple PTCs, which may reduce access time relative to adding additional lines to a single PTC. In some embodiments, PTC 280 is fully associative. In other embodiments, PTC 280 is set associative or direct mapped.

In some embodiments, when TPU 165 receives coordinates for a texture sampling operation, it checks the coordinates for hits in PTC 280 before accessing texture memory in L0 cache 210 or above. Checking for hits may include comparing received tags (e.g., portions of received coordinates) with the stored tags in PTC 280. Thus, using PTC 280 may avoid accessing memory and may also avoid a need to translate the coordinates to a memory address when there is a hit. The coordinates may be provided by sample instructions in a graphics program, for example. In some embodiments, TPU 165 is configured to process multiple sets of coordinates per cycle. In these embodiments, TPU 165 may be configured to check the coordinates for uniqueness. In some embodiments, uniqueness is determined based on whether the coordinates are for the same texel. In other embodiments, uniqueness is determined based on whether texels corresponding to the different coordinates would share a line in PTC 280. For example, in embodiments in which entire lines are either valid or invalid (i.e., partial validity is not allowed) if two coordinates would hit on the same line, they may be considered non-unique. In some embodiments, multiple non-unique coordinates are grouped and checked only once, as a group, for hits in PTC 280. This may reduce power consumption in checking PTC 280 for hits.

In some embodiments, PTC 280 maintains a common texture ID and is configured to ensure that all entries in PTC 280 are from the same texture. In some embodiments, the tags are generated using x, y, and z coordinates and a level of detail (e.g., in embodiments in which multiple mipmaps at different levels of detail may be stored for a given texture, commonly referred to as "mipmapping"). Note that in some embodiments or situations, texture may be one dimensional or have only one level of detail. In these embodiments, the y coordinate and/or LOD may be set to zero, for example. In some embodiments, PTC 280 is read-only, in the sense that once an entry or a portion of an entry is allocated, that entry or portion does not change. In these embodiments, PTC 280 need not maintain information indicating entries that are modified (e.g., a "dirty" bit), because PTC does not allow modification once entries are allocated.

In some embodiments, PTC 280 is configured to maintain separate validity information for different texels in the same line. In these embodiments, a line may thus be partially valid (storing one or more valid texels and one or more invalid texels). In some such embodiments, for misses, PTC circuitry is configured to determine whether a miss shares the same line in PTC 280 as a hit. In these embodiments, PTC circuitry is configured to assign that line as the destination for the return data to be stored (e.g., from one of elements 220A-N, 250, and/or 260) in response to the miss. In some embodiments, if the miss does not share a cache line with a hit, a new line is assigned, e.g., using leading or trailing 1's detection of currently inactive cache lines (where inactive lines are lines that were not hit and are not yet chosen as a destination for a miss). Leading/trailing 1's detection is a well-known technique to those of skill in the art. The determination of where to place return data for PTC misses may be timing critical. In some embodiments, to reduce the time required for this determination, multiple PTCs are implemented in parallel. The allocation examples discussed herein are exemplary and are not intended to limit the scope of the present disclosure; in other embodiments, any of various appropriate allocation and replacement schemes may be utilized for PTC 280.

In some embodiments, PTC circuitry is configured to accept a limited number of coordinates per cycle. In some embodiments, if a greater number of coordinates is available, then PTC circuitry is configured to stall the pipeline and handle sets of coordinates on different cycles.

Figure 4:
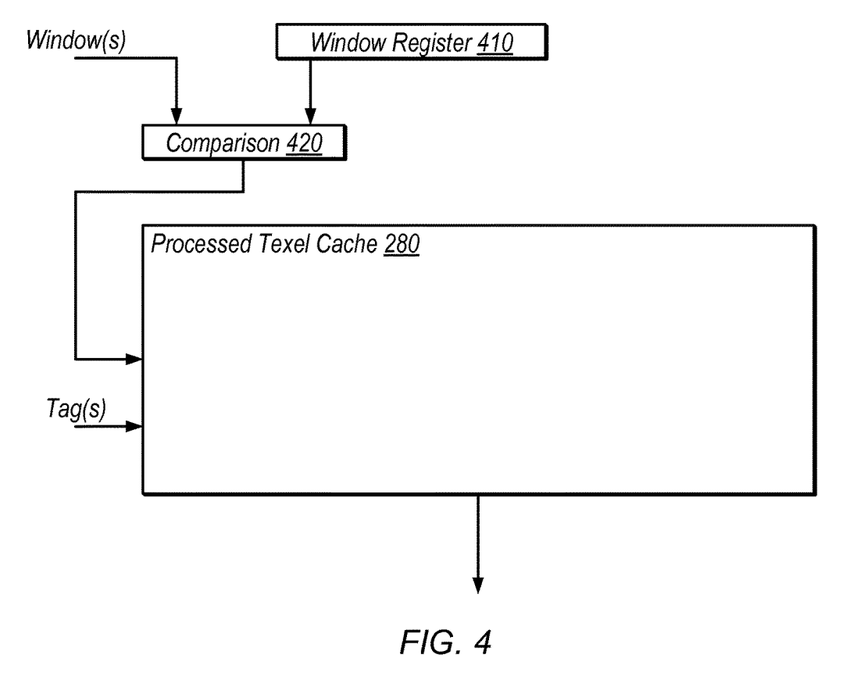
FIG. 4 is a block diagram illustrating a processed texel cache that implements windowing, according to some embodiments.

FIG. 4 shows a more detailed view of a PTC 280 that uses windowing, according to some embodiments. Because of the spatial locality of many texture processing workloads, the upper bits of x and y coordinates used to access PTC 280 may not change often. Therefore, in some embodiments, TPU 165 is configured to use windowing when accessing PTC 280. In windowed embodiments, TPU 165 may define a particular portion of the texture (a window) and use PTC 280 only for accesses to the texture that fall within the window. For example consider an exemplary 64×64 texel texture with x and y coordinates each ranging from 0 to 63 (left to right and bottom to top). Consider a window defined as the lower left quarter of this example texture. In this example, accesses that have an x coordinate between 0 and 31 and a y coordinate between 0 and 31 would fall within the window. In this particular example, the determination of whether an access falls within the window can be made based on the most significant bit of the x coordinate and the most significant bit of the y coordinate.

In some embodiments, TPU 165 includes a window register 410 for each PTC that stores upper bits of coordinates that outline a window in the current texture. Comparison logic 420, in these embodiments, is configured to compare higher-order bits of incoming coordinates with the contents of window register 410, and TPU 165 uses PTC 280 only for coordinates that match the current window. For example, in these embodiments, TPU 165 may check for hits or misses in PTC 280 only for coordinates in the window and allocates entries in PTC 280 only for coordinates in the window. This may significantly reduce power consumption, in some embodiments, by reducing the number of tag bits stored and compared in PTC 280. Each window may correspond, in various embodiments, to a 128×128 texel region, 256×256 texel region, etc., including non-square regions in some embodiments. Further, in some embodiments, windows of various dimensions may be maintained (e.g., three-dimensional windows if a window in the z-dimension is maintained, one-dimensional windows, etc.).

In windowed embodiments, use of PTC 280 may be limited when processing at the edge between windows (e.g., until making the switch to a new window). The reduction in power consumption from windowing, however, may outweigh any increases in power consumption related to additional processing for coordinates for which PTC 280 is not used. TPU 165 may use various techniques to decide when to switch between windows, e.g., based on the number of incoming accesses to each window over a time interval. For example, if a threshold number of received coordinates fall outside the window (and/or fall within a particular other window), TPU 165 is configured to update the coordinate window, in some embodiments.

In some embodiments, TPU 165 is configured to update the coordinate window only if all incoming coordinates are not in the current window. This may facilitate quick resolution of whether to update the window. In these embodiments, if incoming coordinates span multiple windows, the current window may be maintained. In some embodiments, for incoming coordinates that span multiple windows, TPU 165 may handle coordinates in the current window in a first cycle, update the window, and then handle coordinates in the new window (e.g., allocate entries in PTC 280) in a subsequent cycle. In some embodiments or situations, for incoming coordinates that span multiple windows, TPU 165 may use PTC 280 for coordinates in the current window and simply not use PTC 280 for coordinates outside the current window.

Thus, for a given set of coordinates used to access PTC 280, a first portion of one of more of the coordinate values may be used to determine a window of the access, a second portion of one of more of the coordinate values may be used to determine an index of the access (in indexed embodiments of PTC 280), a third portion of one of more of the coordinate values may be used to as a tag for the access, and a fourth portion of one of more of the coordinate values may be used as an offset into a line of PTC 280 (in embodiments in which lines of PTC 280 include more than one texel). The set of coordinates may include x, y, and/or z coordinates, LOD, texture ID, etc. Further, the window, index, tag, and/or offset portions of an access may include bits from multiple parts of the coordinates. For example, the window portion may include upper bits of both the x coordinate and the y coordinate, in some embodiments.

In some embodiments, the disclosed windowing techniques may be used for other caches that use other addressing schemes, in addition to and/or in place of using windowing for PTC 280. In some embodiments, window register 410 and comparison circuitry 420 are included in PTC 280, while in other embodiments one or both of these elements may be located elsewhere, e.g., as shown in FIG. 4.

Exemplary Method

Figure 5:
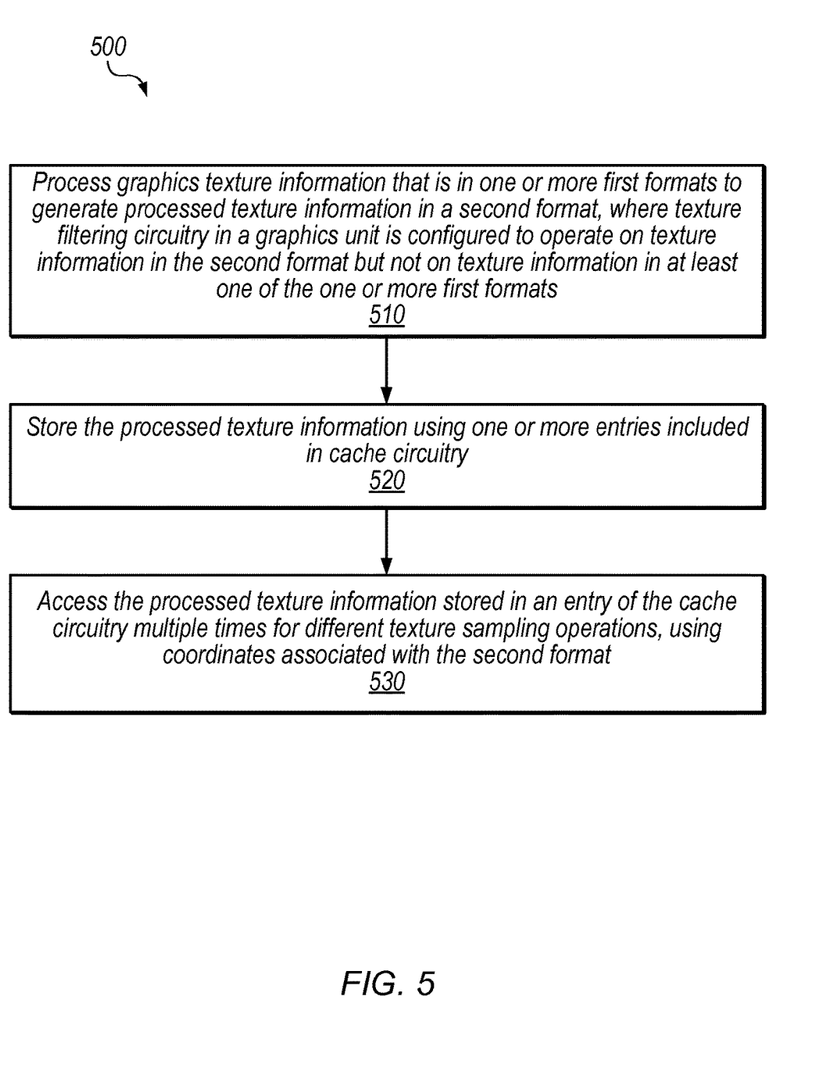
FIG. 5 is a flow diagram illustrating a method for operating a processed texel cache, according to some embodiments.
Figure 6:
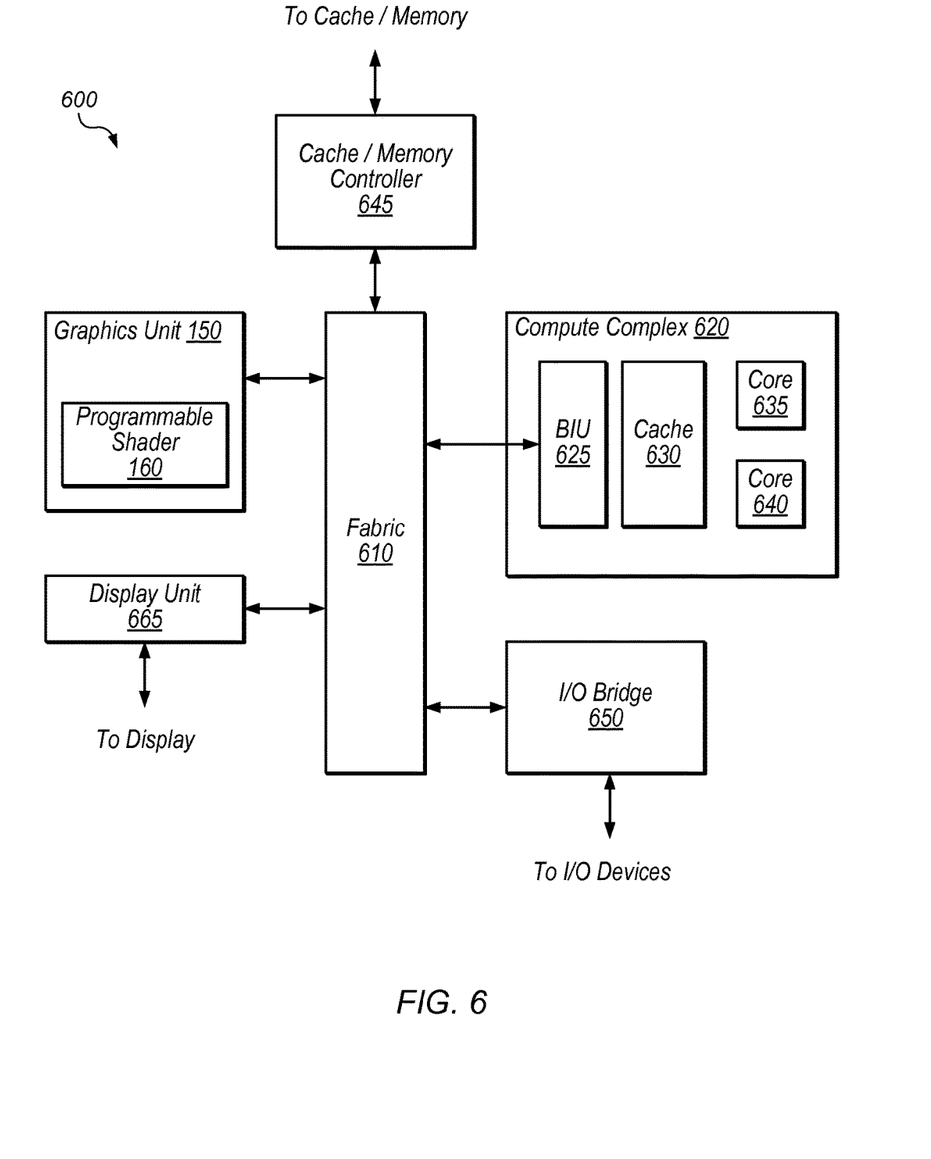
FIG. 6 is a block diagram illustrating an exemplary device, according to some embodiments.

FIG. 5 is a flow diagram illustrating one exemplary embodiment of a method 500 for using a processed texel cache. The method shown in FIG. 5 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. Flow begins at 510.

At 510, a graphics unit processes graphics texture information that is in one or more first formats to generate processed texture information in a second format. In the illustrated embodiment, texture filtering circuitry in the graphics unit is configured to operate on texture information in the second format but not on texture information in at least one of the one or more first formats. In some embodiments, the processing is performed by one or more of elements 220A-N, 250, 260, and 270 of FIG. 2.

At 520, the graphics unit stores the processed texture information using one or more entries included in cache circuitry (e.g., in PTC 280). The processing in 510 may be performed in response to a cache miss in the cache circuitry and the graphics unit may allocate the one or more entries for data returned in response to the miss.

At 530, the graphics unit accesses the processed texture information stored in an entry of the cache circuitry for multiple times for different texture sampling operations, using coordinates associated with the second format. Thus, particular texel data stored in an entry may be retrieved multiple different times between allocation and eviction. This may reduce power consumption relative to processing the texture for each sampling operation.

Exemplary Device

Referring now to FIG. 6, a block diagram illustrating an exemplary embodiment of a device 600 is shown. In some embodiments, elements of device 600 may be included within a system on a chip. In some embodiments, device 600 may be included in a mobile device, which may be battery-powered. Therefore, power consumption by device 600 may be an important design consideration. In the illustrated embodiment, device 600 includes fabric 610, compute complex 620, input/output (I/O) bridge 650, cache/memory controller 645, graphics unit 650, and display unit 665.

Fabric 610 may include various interconnects, buses, MUX's, controllers, etc., and may be configured to facilitate communication between various elements of device 600. In some embodiments, portions of fabric 610 may be configured to implement various different communication protocols. In other embodiments, fabric 610 may implement a single communication protocol and elements coupled to fabric 610 may convert from the single communication protocol to other communication protocols internally.

In the illustrated embodiment, compute complex 620 includes bus interface unit (BIU) 625, cache 630, and cores 635 and 640. In various embodiments, compute complex 620 may include various numbers of processors, processor cores and/or caches. For example, compute complex 620 may include 1, 2, or 4 processor cores, or any other suitable number. In one embodiment, cache 630 is a set associative L2 cache. In some embodiments, cores 635 and/or 640 may include internal instruction and/or data caches. In some embodiments, a coherency unit (not shown) in fabric 610, cache 630, or elsewhere in device 600 may be configured to maintain coherency between various caches of device 600. BIU 625 may be configured to manage communication between compute complex 620 and other elements of device 600. Processor cores such as cores 635 and 640 may be configured to execute instructions of a particular instruction set architecture (ISA) which may include operating system instructions and user application instructions.

Cache/memory controller 645 may be configured to manage transfer of data between fabric 610 and one or more caches and/or memories. For example, cache/memory controller 645 may be coupled to an L3 cache, which may in turn be coupled to a system memory. In other embodiments, cache/memory controller 645 may be directly coupled to a memory. In some embodiments, cache/memory controller 645 may include one or more internal caches.

As used herein, the term "coupled to" may indicate one or more connections between elements, and a coupling may include intervening elements. For example, in FIG. 6, graphics unit 650 may be described as "coupled to" a memory through fabric 610 and cache/memory controller 645. In contrast, in the illustrated embodiment of FIG. 6, graphics unit 650 is "directly coupled" to fabric 610 because there are no intervening elements.

Graphics unit 150 may include one or more processors and/or one or more graphics processing units (GPU's). Graphics unit 150 may receive graphics-oriented instructions, such as OPENGL®, Metal, or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. In the illustrated embodiment, graphics unit 150 includes programmable shader 160.

Display unit 665 may be configured to read data from a frame buffer and provide a stream of pixel values for display. Display unit 665 may be configured as a display pipeline in some embodiments. Additionally, display unit 665 may be configured to blend multiple frames to produce an output frame. Further, display unit 665 may include one or more interfaces (e.g., MIPI® or embedded display port (eDP)) for coupling to a user display (e.g., a touchscreen or an external display).

I/O bridge 650 may include various elements configured to implement: universal serial bus (USB) communications, security, audio, and/or low-power always-on functionality, for example. I/O bridge 650 may also include interfaces such as pulse-width modulation (PWM), general-purpose input/output (GPIO), serial peripheral interface (SPI), and/or inter-integrated circuit (I2C), for example. Various types of peripherals and devices may be coupled to device 600 via I/O bridge 650.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A graphics unit, comprising:
one or more memories configured to store graphics textures in a plurality of different formats;
texture filtering circuitry configured to operate on texture information that is in a particular format and not on texture information that is in one or more of the plurality of different formats;
circuitry configured to receive texture information from the one or more memories in ones of the plurality of different formats and process the received texture information to generate processed texture information that is in the particular format; and
a storage element that includes entries configured to store the processed texture information in the particular format;
wherein the texture filtering circuitry is configured to access processed texture information in an entry of the storage element multiple times as an input for different sampling operations, and wherein the graphics unit is configured to access the storage element using texture coordinates associated with the particular format.

2. The graphics unit of claim 1, wherein the graphics unit is configured to compare a portion of the coordinates with tag information corresponding to entries in the storage element to access the processed texture information.

3. The graphics unit of claim 1, wherein the coordinates include at least: an x coordinate, a y coordinate, and a level of detail coordinate.

4. The graphics unit of claim 1, wherein the graphics unit is configured, during a particular time interval, to access the storage element only for coordinates that fall within a coordinate window.

5. The graphics unit of claim 4, wherein the graphics unit is configured to update the coordinate window based on processing a threshold amount of coordinates that fall outside the coordinate window.

6. The graphics unit of claim 1, wherein, to process the received texture information in at least one of the plurality of formats, the circuitry is configured to decompress the received texture information.

7. The graphics unit of claim 1, wherein, to process the received texture information in at least one of the plurality of formats, the circuitry is configured to convert the received texture information from a first color space to a second color space.

8. The graphics unit of claim 1, wherein the storage element is configured to store processed texture information without modifying the processed texture information until it is invalidated.

9. A method, comprising:
processing, by a graphics unit, graphics texture information that is in one or more of a first set of formats to generate processed texture information in a second format, wherein texture filtering circuitry in the graphics unit is configured to operate on texture information in the second format but not on texture information in at least one of the first set of formats;
storing the processed texture information using one or more entries included in cache circuitry; and
accessing the processed texture information stored in an entry of the cache circuitry multiple times for different texture sampling operations, wherein the accessing uses coordinates associated with the second format.

10. The method of claim 9, further comprising:
allocating an entry in the cache circuitry for new processed texture information that is not already stored in the cache circuitry; and
evicting the entry in the cache circuitry in order to use the entry for the new processed texture information based on replacement information for the cache circuitry.

11. The method of claim 9, wherein the accessing includes comparing a portion of the coordinates for ones of the different texture sampling operations with tag information stored in the cache circuitry.

12. The method of claim 9, wherein the coordinates include at least a level of detail coordinate.

13. The method of claim 9, further comprising:
storing window information that specifies a window in a coordinate space associated with the second format;
comparing a portion of the coordinates for ones of the different texture sampling operations with the stored window information; and
using the cache circuitry for ones of the texture sampling operations only if their corresponding coordinates fall within the window.

14. The method of claim 9, wherein the processing includes converting texture information from a first color space to a second color space.

15. The method of claim 9, wherein the processing includes decompressing texture information.

16. The method of claim 9, further comprising:
selecting an entry in the cache circuitry to store processed texel information in response to determining that the entry was a hit for other processed texel information, wherein the cache circuitry is configured to store multiple texels per entry and is configured to maintain partially-valid entries.

17. An apparatus, comprising:
one or more memories configured to store graphics textures in a plurality of different formats;
texture filtering circuitry configured to operate on texture information that is in a particular format and not on texture information that is one or more of the plurality of different formats;
conversion circuitry configured to process stored graphics textures to generate processed texture information in the particular format, including to:
perform color space conversion on stored graphics textures that use one or more formats than use a different color space that the particular format; and
decompress stored graphics textures that are compressed; and
a cache configured to receive, from the conversion circuitry, processed texture information in the particular format and store the received processed texture information using ones of a plurality of cache entries;
wherein the texture filtering circuitry is configured to perform a plurality of accesses to access processed texture information stored in a cache entry, where the plurality of accesses correspond to different texture sampling operations, wherein the plurality of accesses use texture coordinates associated with the particular format.

18. The apparatus of claim 17, wherein ones of the plurality of cache entries are each configured to store information for multiple texels.

19. The apparatus of claim 18, wherein the apparatus is configured to maintain separate validity information for subsets of the multiple texels, wherein each of the subsets includes one or more texels.

20. The apparatus of claim 17, wherein the apparatus is configured, during a particular time interval, to access the cache only for coordinates that fall within a coordinate window.

* * * * *